(12) United States Patent
Mayr Adam et al.

(10) Patent No.: US 12,055,913 B2
(45) Date of Patent: Aug. 6, 2024

(54) METHOD AND APPARATUS FOR AUTOMATED GENERATION OF A TEST PLAN TO MEASURE A MEASUREMENT OBJECT

(71) Applicant: Carl Zeiss Industrielle Messtechnik GmbH, Oberkochen (DE)

(72) Inventors: Ana Carolina Mayr Adam, Aalen (DE); Stephan Rieger, Oberkochen (DE); Florian Mayer, Backnang (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 766 days.

(21) Appl. No.: 16/950,639

(22) Filed: Nov. 17, 2020

(65) Prior Publication Data

US 2021/0173373 A1  Jun. 10, 2021

Related U.S. Application Data

(63) Continuation of application No. PCT/EP2018/063002, filed on May 17, 2018.

(51) Int. Cl.
*G05B 19/401* (2006.01)
*G01B 21/04* (2006.01)

(52) U.S. Cl.
CPC ......... *G05B 19/401* (2013.01); *G01B 21/047* (2013.01); *G05B 2219/37453* (2013.01); *G05B 2219/37456* (2013.01)

(58) Field of Classification Search
CPC ............................. G01B 21/047; G05B 19/401
USPC ....................................................... 702/155
See application file for complete search history.

(56) References Cited

U.S. PATENT DOCUMENTS

| | | | |
|---|---|---|---|
| 5,465,221 A * | 11/1995 | Merat | G01B 5/008 706/904 |
| 9,235,337 B2 * | 1/2016 | Northrup | G05B 19/409 |
| 2005/0281453 A1 * | 12/2005 | Boyer | G05B 23/0216 382/141 |
| 2012/0095930 A1 | 4/2012 | Rider et al. | |

(Continued)

FOREIGN PATENT DOCUMENTS

| | | |
|---|---|---|
| CN | 103210407 A | 7/2013 |
| DE | 19821371 A1 | 11/1999 |

(Continued)

OTHER PUBLICATIONS

First Office Action in corresponding China Patent Application No. 201880095728.3, Dec. 10, 2021.

(Continued)

*Primary Examiner* — Ricky Go
(74) *Attorney, Agent, or Firm* — Miller Johnson (57) ABSTRACT

A method for generating a resultant test plan for testing a measurement object includes generating at least one data record by measuring the measurement object. The method includes assigning at least part of the measurement object to at least one object class based on the at least one data record. The method includes determining a test plan assigned to the at least one object class as an object-class-specific test plan. The method includes determining the resultant test plan based on the object-class-specific test plan. The assignment of the at least part of the measurement object to the at least one object class is independent of dimensions.

20 Claims, 4 Drawing Sheets

(56) References Cited

U.S. PATENT DOCUMENTS

| | | | |
|---|---|---|---|
| 2016/0300396 A1* | 10/2016 | Yu | G06T 19/20 |
| 2017/0067737 A1* | 3/2017 | Yu | G05B 19/4097 |
| 2017/0090742 A1* | 3/2017 | Ade | G01B 21/047 |
| 2018/0089360 A1 | 3/2018 | Madsen et al. | |

FOREIGN PATENT DOCUMENTS

| | | |
|---|---|---|
| DE | 19821371 A1 | 11/1999 |
| DE | 102012024934 A1 | 6/2014 |
| DE | 102012024934 A1 | 6/2014 |
| WO | 2014019130 A2 | 2/2014 |
| WO | WO-2014191130 A2 | 12/2014 |

OTHER PUBLICATIONS

Second Office Action in corresponding China Patent Application No. 201880095728.3, Jun. 7, 2022.

* cited by examiner

METHOD AND APPARATUS FOR AUTOMATED GENERATION OF A TEST PLAN TO MEASURE A MEASUREMENT OBJECT

CROSS-REFERENCE TO RELATED APPLICATIONS

This application is a continuation of PCT International Application No. PCT/EP2018/063002 filed May 17, 2018. The entire disclosure of the application referenced above is incorporated by reference.

FIELD

The present disclosure is directed to industrial measurement technology and more particularly to generating a test plan for testing a measurement object.

BACKGROUND

The generation of so-called test plans for testing or measuring workpieces is known, with such a test plan defining parameters of a test process, by means of which the quality of a workpiece or measurement object can be determined. By way of example, such a test plan can be set up on the basis of certain general standards or manufacturer or customer specifications. Here, the test plan is carried out by an appropriate testing or measuring machine, for example by a so-called coordinate measuring machine (CMM).

This test plan contains the test features, to be tested, of a workpiece to be measured or information items in relation to these test features. By way of example, such test features can be the distance between the centers of two bores, the deviations of measurement points on a free-form surface from a target form, the relative position of the center of a bore, the diameter of a bore, etc. Likewise, the test plan can contain information items relating to a pose and shape of the workpiece to be tested, e.g., in a test coordinate system, and information items relating to target values of test features. Information items relating to the shape can be contained in the test plan, for example in the form of a CAD model. Such a CAD model can also set the aforementioned target values. Further, the test plan can comprise tolerance specifications for a test feature.

Further, the test plan could set work instructions for carrying out the test defined by the test plan, e.g., in the form of commands, the test parameters to be set for carrying this out and generating data, e.g., illumination parameters or probing forces, and the test components to be used for carrying this out, e.g. sensors. Additionally, the test plan can contain test parameters, which can be set or altered while the test is running, e.g., in order to adapt later (partial) test processes.

Further, a test trajectory, e.g., of a sensor, to be traversed for carrying out the test can be set by the test plan. The test result documentation can also be set by the test plan.

Actual information items generated while the test plan is carried out, e.g., measurement points, images or measurement values, can likewise be stored in the test plan.

As explained above, measurement points to be captured by a measuring device or a measuring machine can be set on the basis of the test plan, said measurement points being required for evaluating the test features. Then, a measurement procedure can be defined in order thereby to capture measurement points on the surface of the workpiece to be measured. Then, the measurement procedure set thus is worked through by the measuring machine (e.g., in the form of a CMM) in a test step or a measurement step, as a result of which the required measurement points are subsequently captured and stored according to the measurement procedure set by the test plan. Thereafter, the individual test features of the test plan are evaluated on the basis of the recorded measurement points, and as a consequence, the data necessary for creating a measurement protocol are obtained. Expressed in general, a test plan can consequently contain prescriptions (e.g., in the form of measurement points to be captured), which directly or indirectly describe a desired measurement procedure.

By way of example, document DE 198 21 371 A1 describes a method for measuring a workpiece with an automated measurement procedure and a coordinate measuring machine which is correspondingly configured to carry out the method. The method comprises three fundamental method steps. In a first method step, the automated measurement procedure is specified, wherein the latter is specified on the basis of test features which are to be evaluated during a measurement procedure. In the process, geometric elements on the workpiece surface are selected using CAD data of the workpiece, which geometric elements are required to test desired test features. In addition, the movement paths for the sensor for sensing the respective geometric elements are specified. In a second method step, a workpiece is then sensed according to the measurement procedure. In a third method step, the test features to be tested are then evaluated on the basis of the measurement data recorded in the measurement procedure and output to the operator of the coordinate measuring machine in a form not described in any more detail. Such output typically takes place in the form of a measurement protocol, which is generated as an electronic document, for example a PDF document.

Applications in which groups of workpieces with the same shape in principle need to be measured are also known, with the workpieces however differing in at least one dimension. By way of example, this dimension can be the overall length. To measure such a group of workpieces, the user needs to either constantly change a parameter, for example the overall length, in software of the measuring machine or remeasure the workpiece length every time.

DE 10 2012 024 934 A1 discloses a solution for creating a measurement program executable on a measuring robot, for the purposes of which an available measuring program is resorted to, which exists for a known measurement object that is as similar as possible to the new measurement object.

SUMMARY

The technical problem of developing a method, a computer program product and an apparatus which simplify, more particularly accelerate, the generation of a test plan and consequently facilitate a simplified, more particularly accelerated, measurement and test of the measurement object arises.

This object is achieved by methods, apparatuses and a computer program product according to the accompanying independent claims. Advantageous developments are specified in the dependent claims. It also goes without saying that, unless otherwise specified or evident, the features mentioned in the introductory description may also be provided individually or in any desired combination or sequence in the solution that is disclosed in the present case.

The inventors have recognized that the outlay for creating a test plan can be reduced if already existing test plans of comparable measurement objects are resorted to for a given measurement object. A basic inventive concept therefore consists of creating the test plan for a given measurement object at least partly on the basis of a test plan for a comparable measurement object.

In detail, a method for generating a resultant test plan for testing a measurement object is proposed,
> wherein at least one data record is generated by measuring the measurement object,
> wherein the measurement object or part of the measurement object is assigned to at least one object class on the basis of data,
> wherein a test plan assigned to the object class is determined as object class-specific test plan and
> wherein the resultant test plan is determined on the basis of the object class-specific test plan.

The method can be carried out in general in computer-based fashion and, in particular, by means of the computer program product explained below or by means of the apparatus. In particular, each method step can be carried out at least partly, predominantly or completely in computer-based fashion or, expressed differently, automatically. However, it is also possible for at least individual method steps to be carried out in manual fashion, either in part (i.e., in semi-automatic fashion) or in full, in particular on the basis of inputs by a user. In particular, the assignment to an object class can be implemented in user-controlled or manual fashion.

The measurement object can be a component or workpiece (in particular one that has been manufactured industrially), an assembly or a general technical system. The data record can be generated on the basis of measuring geometric properties of the measurement object. In particular, the data record can contain or define information items, which allow corresponding geometric properties of the measurement object to be deduced, or which specify these, such as the contour, outline and/or form thereof. Suitable data formats or contents for describing such information items or properties are known to a person skilled in the art. In addition or as an alternative thereto, an orientation and/or a position of the measurement object can be ascertained in a predetermined coordinate system within the scope of the measurement and can preferably also be saved in the data record (or as an additional data record part). In general, the data record can comprise different subsets or partial data records which, in the totality thereof, however preferably combine the information items about the measurement object obtained by measurement. In order to determine correspondences with object classes as explained below, the data record can be searched for properties corresponding to an object class (and/or for data record subsets corresponding therewith). As an alternative or in addition thereto, a pattern recognition method can be carried out on the basis of the data record. By way of example, the data record can be an image data record and comprise image information items.

Measuring can be carried out by means of a suitable measuring device and/or a suitable measurement sensor. A coordinate measuring machine with a tactile or contactless measurement sensor attached thereto is an example of a measuring device. The measurement can also be realized as an optical object measurement, for example on the basis of triangulation, stripe projection and/or camera capture. In addition or as an alternative thereto, the measurement can be carried out on the basis of passing radiation through an object, wherein use can be made of magnetic and/or x-ray radiation, for example. One example relates to measuring an object by means of computed tomography (CT). Further, the measurement object can be measured using light projection and/or by casting shadows. In principle, a measuring device for initially measuring the workpiece and a measuring device or measuring machine for carrying out the test according to the test plan could differ from one another. However, these could also be the same devices or apparatuses. Measuring may also comprise a pictorial capture (possibly only a pictorial capture) of the measurement object in order to carry out a pattern recognition method on the basis of the image information items obtained.

In particular, combinations of the aforementioned measurement principles can also be applied to the measurement. By way of example, coordinate measuring machines which are able to measure a measurement object using a plurality of different sensors (e.g., interchangeable sensors) and hence also on the basis of different measurement principles are known. Measurements by means of white light sensors, tactile sensing sensors and optical sensors using the same coordinate measuring machine are mentioned as an example. In addition or as an alternative thereto, provision can likewise be made for a measurement object to be measured by means of different coordinate measuring machines, which can carry out an object measurement on the basis of in each case individual measurement principles, for example. The measurement information items obtained for each coordinate measuring machine can then be combined as an overall measurement result for a specific measurement object.

Within the scope of the present disclosure, the term "on the basis of data" can generally mean that predetermined or ascertained data (or at least subsets thereof) are used and/or evaluated in order to carry out or prompt further measures on the basis thereof. The measurement information items or results obtained by the measurement can be combined in a data record, which can be used for the assignment to an object class on the basis of data. The data record can be created and/or formatted in accordance with predetermined rules. In particular, it is possible that only selected measurement information items, which are relevant to the assignment to an object class, are saved therein. Here, this can relate to measurement information items in respect of the same properties that also form the basis of the definition of an object class. This reduces the corresponding calculation outlay and, in general, increases the probability that a relevant assignment to the actually relevant object class is successful.

The assignment of the measurement object to an object class can be implemented on the basis of an assignment, known in advance and/or defined in advance, between object properties determinable on the basis of data and properties (likewise known in advance and/or defined in advance) of object classes. By way of example, the properties of an object class can be properties of a reference object of this object class. In general, the assignment can be implemented in automated, semi-automatic or manual fashion, wherein automatic aspects can be realized by means of a computer, for example. An automatic assignment can comprise at least one property of the measurement object being determined on the basis of the data record (and/or on the basis of a subset, describing this property, of the data record). The property and/or subset can subsequently be compared to a corresponding property of at least one object class or of a plurality of object classes in computer-based fashion and without additional user inputs. To this end, use can be made of data records that describe one or more object classes. If a complete or sufficient correspondence to a property of an object class is ascertained, the measurement object can subsequently be assigned to this object class. Ascertaining correspondences can comprise a check to the effect of whether possible deviations between the measurement object and an object class do not exceed a predetermined acceptable measure.

A semi-automatic assignment can comprise proposing at least one object class (in automatic or computer-based fashion) to which the measurement object could potentially be assigned to a user. Then, the user can confirm this proposal by way of a user interaction and/or can make a selection from a possible plurality of proposed object classes. The proposal of an object class can be implemented on the basis of the above-described (preferably automatic) ascertainment of correspondences on the basis of data between the measurement object and the object class or classes.

A manual assignment of the measurement object to an object class can be implemented by way of an appropriate user input. By way of example, the user can independently define or specify an object class and/or enter the latter in a data record of the measurement object. Independently of how the assignment is implemented in detail (i.e., automatically, semi-automatically or manually), the latter can be saved in a storage device. Preferably, the assignment is entered and/or stored in a data record assigned to the measurement object, for example in the same data record which also contains the measurement object-related measurement results.

Within the scope of the present disclosure, general provision can be made for a plurality of object classes (but at least one object class) to be present. The method can also comprise the step of defining at least one object class or else a plurality of object classes, which can be implemented, for example, on the basis of defining and/or selecting properties that define an object class.

The object classes can be described and/or defined in the form of a data record, in particular in such a way that the essential properties of objects belonging to this object class are described in the data record and/or are derivable therefrom. A dedicated data record can be defined for each object. Alternatively, an overall data record can be provided, the latter containing subsets or partial data records, which each define an object class. In general, the object classes can be defined in such a way that the latter combine or define a group of objects with predetermined properties. The properties can be any of the object properties that are ascertainable within the scope of measurement and can be, in particular, geometric object properties, for example a form or contour.

Only parts of objects might also be combined or described within an object class, or objects which can be constituent parts of multi-part objects or assemblies. This allows only parts of a measurement object to be assigned to an appropriate object class. By implication, this can mean that a measurement object which comprises different parts or regions (and in particular differently shaped parts or regions) can also be assigned to different object classes or that different parts or regions can be assigned to different object classes, for example if the different parts or regions correspond to different object classes. Object classes that only describe object parts or parts of assemblies can also be referred to as object subclasses.

Mentioned as an example are tools which have a handle or stem and a tool head attached thereto, which is provided for the actual interaction with further components or objects (e.g., a screwdriver with a handle and a tool head in the form of a blade). An object class can be defined in such a way that the latter merely comprises comparable or identical tool heads, but not possible handles attached thereto. Then, following the measurement, a measurement object in the form of a screwdriver can be assigned purely on the basis of its blade (or tool head), and consequently purely on the basis of part of the measurement object, to an appropriate object class. Additionally, provision can also be made for the handle to be measured as a separate part of the measurement object and for said handle to be assigned to an appropriate handle object class. Consequently, the measurement object (or parts of the measurement object) can be assigned to different object classes. As explained below, this then also allows dedicated test plans to be ascertained for each corresponding part of the measurement object, from which the resultant test plan can be put together.

In general, an object class can be defined on the basis of a class-specific reference object or can comprise the latter. The reference object can be chosen and/or defined in such a way that it has or specifies the object properties that are essential to this object class. A measurement object can then be assigned to the object classes if it likewise has at least some or all of these object properties or properties that are similar thereto to a predetermined extent. The reference object can be created in virtual fashion. Alternatively, a real reference object can be measured. Then, the relevant properties can be derived or selected on the basis of the virtual object or the real measurement results.

The object class-specific test plan can also be referred to as master test plan. Only one object class-specific test plan may be provided per object class. It can specify or define at least parts of a measurement procedure which should be applied to measure objects of this object class. In general, the object class-specific test plan (or else the resultant test plan) can be generated in electronic form or in the form of a file. As explained above, such a test plan can contain or encode at least one test feature, preferably a plurality of test features, of the measurement object to be measured. In particular, the test feature can be a dimension-type variable, for example a length, a distance, a diameter, etc. On the basis of the test plan, it is then possible to define measurement points to be captured and/or a measurement procedure for measuring the measurement object by way of an appropriate measuring device, in particular by way of a coordinate measuring machine. Methods for setting the measurement points and for generating a measurement procedure from a test plan are known to a person skilled in the art and are not the subject matter of this invention.

An assignment of a test plan to the object class can be implemented in advance (i.e., before the method is carried out). In particular, a corresponding assignment can be stored in the form of a data record and/or can be saved in a storage device. Determining an object class-specific test plan can comprise a test plan being ascertained and/or read, for example on the basis of an appropriate assignment, said test plan belonging to an object class assigned to the measurement object. This is preferably implemented automatically, for example by an automatic or computer-based readout of the corresponding test plan from a saved data record.

The ultimately determined resultant test plan can comprise or correspond to the object class-specific test plan. Alternatively, the resultant test plan can be determined on the basis of adapting the object class-specific test plan, as will still be explained in more detail below. If the test plan is ascertained on the basis of an object class which only corresponds to part of the measurement object, the resultant test plan can be ascertained for this measurement object part only on the basis of the object class-specific test plan (by way of example, comprise or correspond to the object class-specific test plan for this part). By contrast, for a remaining part of the measurement object, which corresponds to no object class or some other object class, the test plan can be defined on the basis of other information items, test plans or prescriptions. Consequently, the resultant test plan can also be only partly ascertained on the basis of the object class-specific test plan and/or can be combined from different object class-specific test plans, for example if the measurement object comprises different parts or regions which should be assigned to different object classes. In this case, the object class-specific test plans (and/or the resultant test plan) can be provided with information items which specify the parts of the measurement object (or the regions) to which they should be applied.

What thus can be achieved overall is that a user need not manually set all test features to be examined and/or measurement procedures for the purposes of generating the test plan. Instead, a suitable test plan can be partly or completely specified on the basis of an ascertained assignment to a predefined object class. Firstly, this reduces the time taken to generate a test plan and hence also to test the measurement object; secondly, this also increases operator convenience when generating the test plan.

In overarching fashion, any test plan (i.e., any resultant or object class-specific test plan) can, within the scope of the present disclosure, correspond to one of the variants discussed at the outset and/or comprise information items of the type specified at the outset. In the most general form, a test plan can define prescriptions for measuring an object (e.g., the measurement object), i.e., for example, the procedure of measurement and/or the measurement points to be measured. In particular, the test plan can define test features to be checked and, preferably, measurement points accompanying these. Further, at least one test criterion can be defined, the latter being assigned to a test feature. The test criterion can be evaluated after determining the test feature within the scope of a measurement object measurement and the measurement results obtained in the process (e.g., in the form of a measurement data record).

A development of the methods and the apparatuses provides for the data record to be generated by a (partial or complete) three-dimensional measurement of the measurement object. The three-dimensional measurement can comprise capturing the three-dimensional shape and/or three-dimensional form of the measurement object, at least in part but preferably in full. By way of example, this can be implemented by means of computed tomography methods. Such a measurement facilitates a comprehensive and particularly precise ascertainment of properties of the measurement object and consequently increases the accuracy within the scope of an assignment to an object class fitting thereto. In particular, a data record comprising so-called voxels can be generated.

In a further embodiment of the apparatuses and the methods, a pattern recognition method is carried out on the basis of data, wherein the measurement object is assigned to an object class if at least one recognized pattern (recognized for or in the measurement object and/or its data record) corresponds to an object class-specific pattern or does not deviate therefrom by more than a predetermined measure. In general, the pattern can be defined in two dimensions or three dimensions and/or correspond to, or define, a two-dimensional or three-dimensional form, outline or contour. As an alternative or in addition thereto, the pattern can be defined by data, e.g., image properties, which are obtained when capturing the measurement object (e.g., obtained in a result or evaluation image). The measurement results of the measurement object, which may be combined in the form of a data record, for example, can be checked to the effect of whether the corresponding pattern is recognized therein or, expressed differently, is present therein. Methods for pattern comparison are known from the prior art and can be used for implementing the embodiment explained.

The object class-specific pattern can be defined in advance and can preferably likewise describe a two-dimensional or three-dimensional form, outline or contour, or else be defined by predetermined data, in particular image properties. By way of example, the predetermined measure can be defined in such a way that a surface portion and/or a general portion of the pattern which deviates from the object class-specific pattern must not deviate from the pattern by more than a predetermined measure (e.g., it must not deviate by more than a predetermined percentage of the overall area of the pattern).

An advantage of the explained pattern recognition is that an assignment of the measurement object to an object class can be realized quickly and precisely and, preferably, also substantially or completely automatically.

According to a further variant of the methods and the apparatuses, the assignment of the measurement object or of the part of the measurement object to an object class is independent of dimensions. By contrast, provision can be made, in general, for this assignment not to be independent of form and/or geometry. Independence of dimensions can comprise that no specific measurements (e.g., in the form of a length, height or width) are considered, but only forms, contours and/or outlines, for example. Expressed differently, scalable forms, contours and/or outlines (i.e., forms, contours and/or outlines that can be enlarged and/or reduced as desired) can be considered, or a corresponding scalability can be assumed. If corresponding forms, contours, outlines or other geometric features are identified in the measurement object and/or in the object class, for example on the basis of the aforementioned pattern recognition, which generally can likewise be implemented independently of dimensions, e.g., on the basis of dimension-invariant patterns, then it is consequently possible to undertake an assignment even though these features deviate from one another in respect of their dimensions or measurements. Instead, the decisive property for undertaking an appropriate assignment can be considered to be purely the form and/or geometry of the measurement object and of the object class.

What this variant can facilitate is that the number of object classes to be defined is reduced, since a dedicated object class need not be defined for every possible measurement. Further, the calculation outlay required within the scope of the assignment can be reduced, for example since fewer object classes and/or, on account of the unconsidered measurements, fewer information items need to be checked or compared.

A development of the methods and the apparatuses provides for the resultant test plan to be at least partly generated by adapting the object class-specific test plan, wherein the adaptation of the object class-specific test plan is carried out on the basis of a difference between the measurement object and the object class (and/or between the measurement object and an object class-specific reference object). The difference can relate, in particular, to a dimensional difference or, expressed differently, a difference in respect of the measurements of the measurement object and possible dimensions and/or measurements used to define the object class, in particular dimensions and/or measurements of a reference object of the object class. If the object class is defined on the basis of an object class-specific reference object or if such a reference object can be defined and/or derived on the basis of the object class, it is also possible to consider the difference between the measurement object and the corresponding reference object (e.g., on the basis of a comparison of these objects). In this case, too, it is possible to consider dimensional differences and/or differences in respect of measurements. In general, adapting can comprise substantial or complete evening out or, expressed differently, compensation of an ascertained difference.

In addition or as an alternative thereto, it is possible to consider pose differences, orientation differences and/or position differences. A pose, orientation and/or positioning of the object class-specific test plan (or the information items saved and/or encoded therein) can be suitably adapted according to the stipulation of an appropriate ascertained difference, in particular to the effect of this difference being evened out or compensated. By way of example, differences in position can be evened out by means of a translation and orientation differences can be evened out by means of a rotation. In general, coordinates or position information items defined in the object class-specific test plan can thus be scaled, translated and/or rotated accordingly.

This can be implemented in a reference coordinate system set in advance. To this end, it may be necessary to carry out appropriate coordinate transformations into the reference coordinate system.

Adapting is particularly relevant if the assignment of the measurement object to an object class is implemented independently of dimensions. In this case, adapting the test plan can ensure that the latter is in fact suitable for being able to check a measurement object which, for example, has different dimensions to that of the reference object. By way of example, positions of measurement points, which are defined in the test plan or on the basis of the test plan, can be adapted to the specific measurements of the measurement object.

In general, the adaptation allows the requirements on the measurement of the measurement object, or on the measuring device used to this end, to be reduced since subsequent options for evening out possible deviations are created. By way of example, such requirements can be the requirements in respect of the positioning and/or orientation accuracy of the measurement object in a measuring space of the measuring device. Furthermore, the adaptation renders it possible to not have to define dedicated object classes for all conceivable variants of a measurement object and not have to check said object classes with a correspondingly high calculation outlay within the scope of an examination of assignment options.

In this context, provision can further be made for a geometric transformation between the measurement object or part of the measurement object and a reference object (which describes the object class) assigned (to) the object class-specific test plan to be determined, wherein the adaptation of the object class-specific test plan is carried out on the basis of the transformation. In general, the adapted object class-specific test plan can be chosen as part of the resultant test plan or can form said resultant test plan. Expressed differently, the adaptation according to any one of the aforementioned variants can be implemented in such a way that the adapted object class-specific test plan can be used and worked through directly as part of the resultant test plan or as the resultant test plan.

In general, the geometric transformation can be carried out on the basis and/or according to the stipulation of the ascertained difference. In particular, the geometric transformation can comprise scaling (i.e., enlargement or reduction), rotation and/or translation of geometric specifications or information items (e.g., in the form of a position of measurement points) saved in the test plan or, in general, of test plan elements according to the stipulation of the ascertained difference. In addition or as an alternative thereto, corresponding statements and information items can also be adapted according to the stipulation of an ascertained pose difference, orientation difference and/or position difference, in particular in such a way that orientation or position information items (e.g., in respect of measurement points or measurement regions defined in the test plan) are adapted in a suitable manner.

Further, the object class-specific test plan can be adapted on the basis of a spatial pose of the measurement object according to one variant of the methods and apparatuses. The spatial pose can be a two-dimensional and/or three-dimensional pose or a pose defined in a two-dimensional and/or three-dimensional coordinate system, in particular in the reference coordinate system. Such an adaptation can even out, in particular, relative rotations and/or general differences in orientation between the measurement object and the object class or an object class-specific reference object. Consequently, the test plan can then be generated immediately for the measurement object in its current spatial pose. Adapting the test plan can comprise, in turn, the suitable adaptation of the orientation or position information items (e.g., in respect of measurement points defined in the test plan) saved therein.

The above-described variants for adapting the test plans increase the user convenience and reduce the time required to create the resultant test plan since user inputs are less comprehensive or may even be dispensed with completely. Instead, relevant differences can be ascertained automatically (i.e., substantially independently of user inputs) and preferably also be compensated automatically. However, provision can also be made for the adaptation to be carried out at least partly in manual fashion, for example if a user specifies a preferred orientation and the object class-specific test plan is adapted on the basis thereof.

In a development of the methods and the apparatuses, measurement points are determined from the resultant test plan and verified for the measurement object, wherein the resultant test plan is verified if the measurement points have been verified. This resultant test plan can be referred to as verified resultant test plan. Verification can comprise searching for test elements (e.g., in the form of associated measurement points) defined in the test plan on the measurement object. In turn, the search can be based on the basis of a pattern recognition and/or a contactless (e.g., optical) or tactile capture of the measurement object. Expressed differently, it is possible to ascertain whether coordinates of test elements and/or measurement points (or, in general, an orientation and/or position specification of test elements and measurement points) defined in the test plan are actually located on the measurement object and/or located within predetermined regions of the measurement object. By contrast, should empty space or an unexpected region of the measurement object be present at the relevant coordinates, the measurement point, and hence also the test plan, cannot be verified.

This variant can ensure that a test plan, for example adapted according to the stipulation of the variants described above, is in fact applicable to the measurement object in the desired manner. Consequently, it is possible to ensure that the test plan per se is applicable and/or facilitates a desired measurement or checking accuracy with a sufficient probability.

In this context, provision can further be made for position information items of measurement points, which were predetermined on the basis of the transformation, to be used for the verification. Expressed differently, an examination can be carried out within the scope of the verification as to whether position information items of measurement points obtained on the basis of the above-described transformation in fact encode measurement points present on/at the measurement object. In turn, this can comprise a check to the effect of whether the corresponding measurement points are in fact located on the measurement object or in predetermined regions of the measurement object.

In a development of the methods and the apparatuses, an assignment, known in advance, between object properties (of the measurement object) determinable on the basis of data and the object classes and/or an assignment, known in advance, between object classes and (object class-specific) test plans is/are adapted on the basis of object properties of a measurement object currently measured (for which the resultant test plan is determined) and/or the resultant test plan assigned to such a measurement object. Consequently, the assignment(s) can be an adaptive assignment. Expressed differently, a flexible or, in other words, adaptive adaptation of the corresponding assignments is facilitated. By way of example, the adaptation can be implemented on the basis of an above-described determined difference. In addition or as an alternative thereto, the adaptation can be implemented on the basis of a compensation, carried out, to even out this difference (e.g., on the basis of a geometric transformation). By way of example, should it be ascertained that a measurement object with a certain form be unexpectedly large or small, the test plan of the associated object class (i.e., the object class-specific test plan) can be adapted in a manner analogous to the test plan scaling explained above. As a consequence, a correspondingly scaled object class-specific test plan is also assigned to this object class in future. In addition or as an alternative thereto, it is possible to facilitate an appropriate adaptation of the assignments, known in advance, if a user carries out a manual assignment or manually changes a test plan and/or an object class and/or an object property determinable on the basis of data, in particular if the assignments, known in advance, deviate from the assignments undertaken or altered by the user.

In one embodiment of the methods and the apparatuses, provision is further made for measurement information items for measuring the measurement object to be determined and preferably also be displayed to a user on the basis of an object class. In particular, measurement information items that are intended to simplify measuring the workpiece according to the stipulation of the test plan and/or increase the obtainable measurement or test accuracy can be saved in the object class. By way of example, the measurement information items can comprise notifications for a user relating to a suitable measurement or check. In particular, notifications in respect of suitable clamping of the object, the measurement methods to be used or the tolerance classes to be taken into account can be defined as measurement information items and can be saved. These measurement information items can be displayed to a user according to the stipulation of the ascertained assigned object class, for example on a display device of a conventional PC and/or of an apparatus as explained below.

In a further embodiment, the method is carried out as a simulation. Expressed differently, it is possible for a data record representing the measurement object to be generated by simulation of a measurement method. To this end, a method for generating a virtual image representation of the measurement object, for example, can be applied. Such a method is disclosed in, e.g., WO 2014/19130 A1, the entire disclosure of which is referred to herewith. In particular, such methods also facilitate the simulation of optical or tactile measurement methods.

Also proposed is a program which, when executed on or by a computer or an evaluation device, causes the computer to carry out one, a plurality or all of the steps of the method illustrated in this disclosure for generating a test plan for testing a measurement object. Alternatively or cumulatively, a program storage medium or computer program product, on or in which the program is stored, in particular in a non-temporary, e.g. permanent, form, is described. Alternatively or cumulatively, a computer which comprises this program storage medium is described. Moreover, alternatively or cumulatively, a signal is described, for example a digital signal, which codes information items representing the program and which comprises coding means suitable for performing one, a plurality or all of the steps of the method set out in this disclosure for generating a test plan for testing a measurement object. The signal can be a physical signal, for example an electrical signal, which in particular is generated technically or by machine. The program can also prompt the computer to carry out the test plan, i.e., carry out a test of the measurement object in accordance with the test plan.

Furthermore, the method for generating a test plan for testing a measurement object can be a computer-implemented method. In this regard, for example, one, a plurality or all of the steps of the method can be carried out by a computer. One embodiment of the computer-implemented method is the use of the computer for carrying out a data processing method. For example, the computer can comprise at least one computing device, in particular a processor, and for example at least one storage device, in order to process the data, in particular technically, for example electronically and/or optically. A computer can in this case be any kind of data processing appliance. A processor can be a semiconductor-based processor.

Further, the invention relates to an apparatus for generating a resultant test plan for testing a measurement object,
wherein the apparatus comprises at least an evaluation device and at least a device for measuring the measurement object,
wherein at least one data record is generable by measuring the measurement object,
wherein the measurement object or part of the measurement object is assignable to at least one object class on the basis of data, wherein a test plan assigned to the object class is determinable as object class-specific test plan,
wherein the resultant test plan is determinable on the basis of the object class-specific test plan.

The device for measuring the measurement object can be realized as a coordinate measuring machine (CMM) or comprise the latter. This device can also comprise the evaluation device, particularly a computing device, further particularly with at least one microcontroller. The data record can be generated by means of the device for measurement purposes, for example by a control device or else the evaluation device thereof, which may each comprise a corresponding data generation function. The evaluation device can access this data record in order to carry out the further method steps or method measures. The assignment of the measurement object to an object class can also be carried out by means of a control device of the device for measurement purposes (e.g., on the basis of possible assignment functions thereof). Alternatively, the assignment can be implemented by means of the evaluation device, or else in user-controlled fashion. The resultant test plan can likewise be determined by means of the evaluation device or else the control device of the device for measurement purposes (which can each comprise an appropriate determination or setting function). Further, the evaluation device or else the control device of the device for measurement purposes can be configured to carry out a pattern recognition of the type explained above.

In overarching fashion, the apparatus can also comprise a storage device (preferably, an electronic and/or digital storage device), for example in order to store at least one of the following information items therein: the measurement results, the data record, the object class(es), at least one object class-specific test plan, possible patterns for pattern recognition and/or the program instructions required for pattern recognition, the resultant test plan.

In general, the apparatus may comprise any development and any further feature in order to provide or perform all of the steps, operating states and functions mentioned above or below. In particular, the apparatus may be designed to implement a method according to any of the aspects mentioned above or below.

The invention also relates to a method for testing a measurement object, wherein a test plan is generated by a method according to any one of the preceding aspects and wherein the measurement object is tested in accordance with the test plan. Testing can be carried out by means of a measuring device, for example in the form of a coordinate measuring machine. In particular, the testing may comprise measuring the measurement object in accordance with stipulations defined in the test plan. Consequently, testing can also comprise driving a measuring device used for the measurement object measurement in accordance with the stipulation of the test plan, in particular according to the stipulation of measurement prescriptions or instructions that are defined and/or encoded in the test plan. This driving can be implemented by means of a suitable control device.

In particular, as already explained above, measurement points of the measurement object to be captured on the basis of the test plan can be set within the scope of this method. These can then be captured during the measurement. Then, as likewise already described above, the test features can be captured on the basis of the measurement points. Further, test criteria can be evaluated on the basis of these test features, for example by way of so-called threshold-based methods.

Finally, the invention relates to an apparatus for testing a measurement object, wherein a test plan is generable using a method according to one of the preceding aspects, wherein the apparatus comprises at least a control device (e.g., an electronically and/or digitally operable control device) for carrying out the test plan and wherein the measurement object is testable and/or tested in accordance with the test plan (e.g., by carrying out the test plan by means of the control device). By way of example, the control device can be designed to read and/or carry out program instructions for carrying out the test plan (or else to read and/or carry out the test plan per se). To this end, the control device can comprise a suitable interface unit and/or data connection, for example to an evaluation device, which was described above. In particular, the control device can comprise a processor unit, on which a computer program product of the type explained above, for example, is stored and/or executable. In general, the control device can be configured to drive and/or operate, according to the stipulation of the test plan, a measuring device and/or an evaluation device of the type described above. In overarching fashion, the control device can consequently prompt the test plan to be carried out and control the measurement procedure accompanying this. Carrying out the test plan can comprise, in particular, predetermined measurement points on the measurement object being selected and captured or measured.

The method above and the apparatus for testing the measurement object, too, can comprise all developments, embodiments and aspects, which are explained above or below in respect of the corresponding identical features.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

An embodiment of the invention is explained below on the basis of the accompanying schematic figures. Features that coincide in their nature and/or function may in this case be provided with the same reference signs throughout the figures. In the figures.

DETAILED DESCRIPTION

Identical reference signs hereinafter denote elements having identical or similar technical features.

Figure 1:
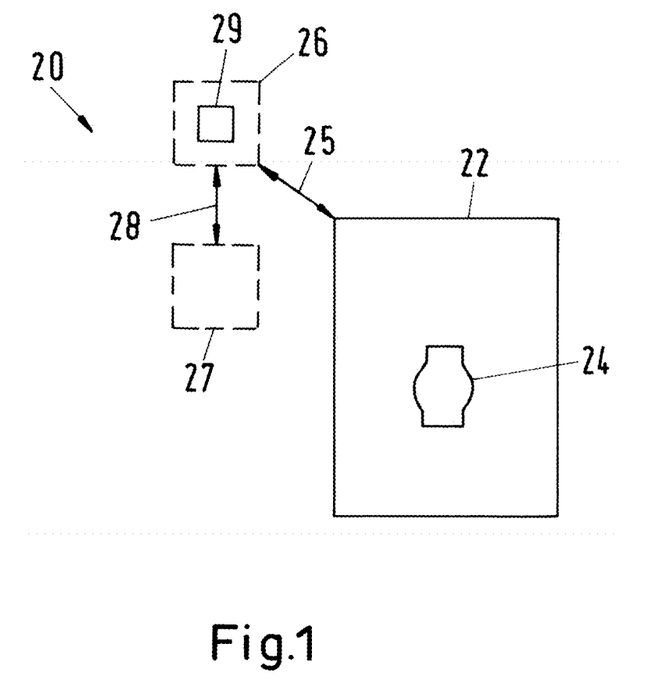
FIG. 1 shows a schematic sketch of a first apparatus according to the invention, by means of which a first method according to the invention is able to be carried out.

The first apparatus 20, schematically very much simplified in FIG. 1, comprises a device 22 for preferably three-dimensional measurement of a measurement object 24. Below, the device 22 is also referred to as measuring device 22. In principle, the measuring device 22 serves to measure the measurement object 24 in three dimensions during an initial stage of the method and, in particular, to determine the three-dimensional form of the latter. In the example shown, the measuring device 22 to this end is embodied as an industrial computed tomography device. The measurement object 24 is any desired workpiece, specific examples of which are still shown in the subsequent further figures.

In the shown case, the apparatus 20 serves to generate a resultant test plan by measuring the measurement object 24 and assigning the latter to a predetermined object class. By contrast, the apparatus 20 is not provided to work through test plans by measuring individual measurement points on the measurement object 24, although this could likewise be envisaged. Instead, a coordinate measuring machine, not illustrated, is used to work through the test plan for the measurement object 24. An example of such a coordinate measuring machine is found in FIG. 6, discussed below.

The apparatus 20 of FIG. 1 also comprises an evaluation device 26, which is realized by conventional PC or which may be comprised by the latter. The evaluation device 26 comprises a processor unit 29, in order to be able to carry out program instructions of a computer program product and consequently carry out the method as per FIG. 2 below. To this end, the evaluation device 26 further provides a data record generation function, an object class assignment function, a test plan determination function and resultant test plan determination function, and optionally also a test plan adaptation function. The evaluation device 26 is connected to the measuring device 22 in a manner allowing data transfer by way of a (wired or wireless) data connection 25.

The apparatus 20 also comprises a storage device 27, which may likewise be comprised by the PC which also comprises or forms the evaluation device 26. Alternatively, the evaluation device 26 itself can comprise an appropriate storage device 27. The storage device 27 is connected to the evaluation device 26 in a manner allowing data transfer by way of a (wired or wireless) data connection 28. Data records by means of which a plurality of object classes are defined are saved in the storage device 27. By way of example, the data records can contain information items in respect of geometric properties of a respective object class, such as predetermined object class-specific three-dimensional forms, for example. Further, the data records comprise an object class-specific test plan per object class. Expressed differently, each object class is linked to one associated (preferably a single associated) object class-specific test plan, which can be read by the evaluation device 26 and which can optionally be adapted in the manner described below.

Not shown separately in FIG. 1 is at least one optional input device of the apparatus 20 for user inputs, for example in the form of a touchscreen, a touch-sensitive input surface (e.g., in the form of a touch-sensitive display device), a keyboard, a joystick or a mouse. Such input devices can be used for any one of the optional user inputs described above or below.

Figure 2:
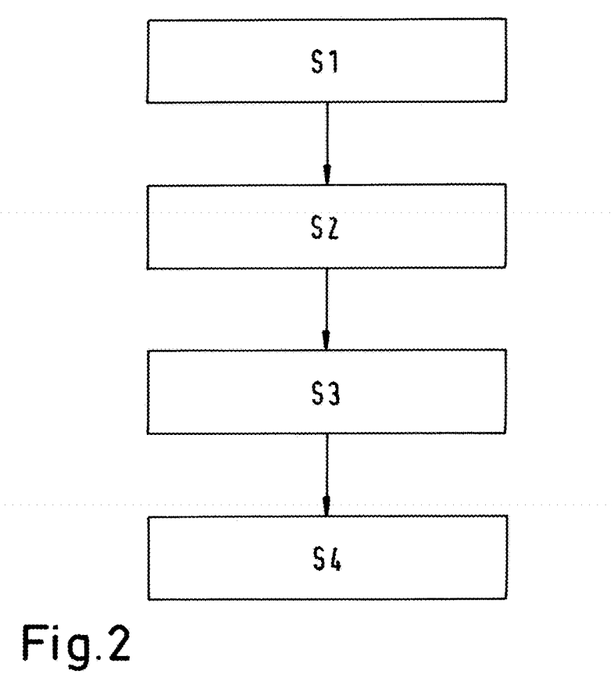
FIG. 2 shows a flowchart of the first method according to the invention.

FIG. 2 shows a flowchart of a method according to the invention, as is able to be carried out by the apparatus 20 of FIG. 1. In a first step S1, the measurement object 24 is measured in three dimensions and a data record is generated by the evaluation device 26 by virtue of the three-dimensional properties (i.e., in particular, the geometric properties) being combined on the basis of the measurement results obtained. By way of example, this data record can describe or specify the form of the measurement object 24 or else contain information items from which desired properties can be reconstructed.

In a step S2, the evaluation device 26 undertakes a comparison on the basis of data (based on the created data record) between the ascertained properties of the measurement object 24 and the properties stored in the storage device 27 for the individual object classes or properties specifying these object classes. If a sufficient correspondence is identified in the process, the measurement object 24 (or only a part thereof, as explained below) is assigned to the corresponding object class.

In step S3, the evaluation device 26 ascertains and reads the object class-specific test plan, likewise saved in the storage device 27, for precisely this object class which was assigned to the measurement object 24.

In step S4, a resultant test plan is thereupon determined for the measurement object 24 on the basis of, or expressed differently depending on, this object class-specific test plan. Examples of a corresponding determination of the resultant test plan, including possible adaptations carried out to this end by the evaluation device 26, are explained below on the basis of the further figures.

The resultant test plan can subsequently be made available to a measuring machine, not illustrated, in order to measure the measurement object 24 according to the stipulation of the prescriptions defined in the test plan (or of the measurement points defined therein or derivable therefrom). This measuring machine can be the coordinate measuring machine 60 from FIG. 6.

Figure 3A:
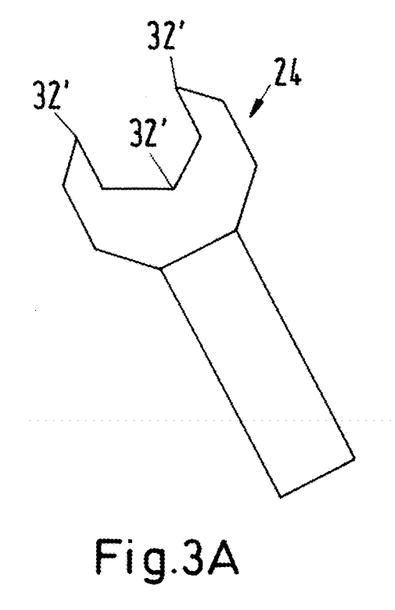
FIGS. 3A-3B show an example of a measurement object and an object class-specific reference object, wherein test plans are adapted by scaling.
Figure 3B:
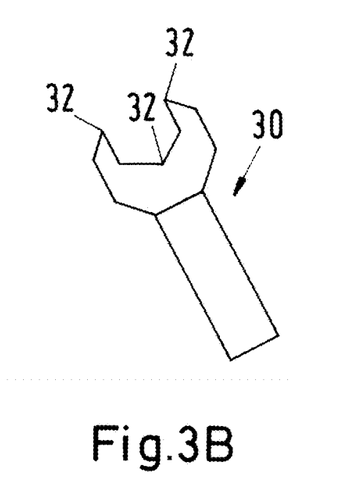

FIG. 3A shows an example of a measured measurement object 24 in the form of an open-ended spanner. By contrast, FIG. 3B shows an example of a reference object 30, which has the properties defined in an associated object class or which defines a corresponding object class. The reference object 30 is likewise embodied as an open-ended spanner. In general, the reference object 30 could be a purely virtual object, which, for example, is created or defined by a user (e.g., per CAD [computer-aided design]), or else a real object, which is measured to define an object class. Subsequently, properties can be derived and/or selected in automatic, semi-automatic or manual fashion on the basis of the corresponding virtual or real reference object in order to define the object class.

In the shown example, the three-dimensional form of the reference object 30 is combined in a data record or, expressed differently, described in a data record, wherein this data record is also used to define an object class belonging to the reference object 30. Expressed differently, the object class 30 is consequently defined in form-specific fashion on the basis of the reference object 30, and it relates to an open-ended spanner 30, as shown in FIG. 3B. Here, it is understood that a plurality of object classes could also be saved in the storage device 27 of FIG. 1, said object classes describing, e.g., different variants or forms of open-ended spanners or else other tools.

The properties of both the measurement object 24 and the reference object 30, or the associated object class, can be available, in particular, in the form of patterns (preferably three-dimensional patterns) or can be combined or defined in the form of such patterns. As explained above, the patterns can describe two-dimensional or three-dimensional forms, outlines or contours or else describe general image properties, which are obtained in a result image when capturing and/or measuring an object 24, 30. Then, by means of known image evaluation and/or pattern recognition algorithms, the evaluation device 26 can carry out a check as to whether patterns of an object class are also identified in a measurement object, or are present therein. Should this be the case, the measurement object can be assigned to the corresponding object class.

In principle, provision can also be made for the specific measurements (i.e., the dimensions) of the reference object 30, in addition to the form, to be captured and to form the basis of the definition of the associated object class. However, this is not envisaged in the example shown. Instead, the object class is defined independently of dimensions and purely in form-specific fashion. Accordingly, it is also possible to identify in FIG. 3A that, although the measurement object 24 has an identical form to the reference object 30, it is significantly larger than the latter (i.e., in particular longer and wider). Nevertheless, the evaluation device 26 assigns the measurement object 24 to the object class belonging to the reference object 30 on account of the corresponding form, wherein this correspondence is identified on the basis of the explained pattern recognition, for example.

An object class-specific test plan is also specified for the object class of the reference object 30, in which test plan test features including associated measurement points to be checked are defined and/or such measurement points can be derived from said test features. FIG. 3A shows examples of three corresponding measurement points 32. Coordinates or position information items for these measurement points 32 are defined in an object coordinate system and are saved in the object class-specific test plan.

However, on account of the size difference between the measurement object 24 and the reference object 30, these measurement points cannot readily be applied to the measurement object 24 as well. Instead, the test plan (or the position information items of the measurement points 32 stored therein) must be adapted and geometrically transformed in the shown case. Here, the geometric transformation relates to scaling and, specifically, the enlargement of the reference object 30 (or of its associated test plan and/or the position information items defined therein), in order to even out this size difference. To this end, different mathematical approaches, known per se, come into question.

As a result, an adapted resultant test plan is thus obtained on the basis of the object class-specific test plan, in which resultant test plan the position information items of the measurement points 32 of the object class-specific test plan were adapted in order to obtain resultant position information items or measurement points 32' (see FIG. 3A).

It is understood that other information items saved in the object class-specific test plan and, in particular, geometric information items can also be adapted in accordance with the scaling undertaken. Further, provision can also be made for a possible difference in orientation to be considered between the measurement object 24 and the reference object 30, for example in a machine coordinate system. In this case, too, a transformation can be carried out by means of mathematical approaches known per se in order to suitably adapt position information of the measurement points 32 to resultant position information items or measurement points 32' and to preferably compensate the difference in orientation.

Further, at least individual ones of the transformed measurement points 32' can initially be verified before working through or carrying out the test plan. By way of example, this can be implemented by virtue of a measuring machine carrying out the test plan (see, e.g., coordinate measuring machine 60 in FIG. 6) initially ascertaining whether the measurement object 24 to be measured is in fact present at the transformed measurement points 32' (i.e., whether a mass or empty space is present there). Should this be the case, the resultant test plan can be referred to as verified resultant test plan and can be worked through.

Figure 4A:
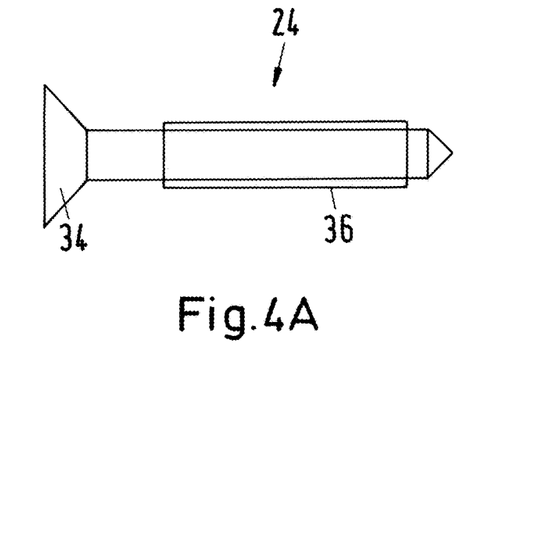
FIGS. 4A-4B show a further example of a measurement object and an object class-specific reference object, wherein object classes are only assigned for parts of the measurement object.
Figure 4B:
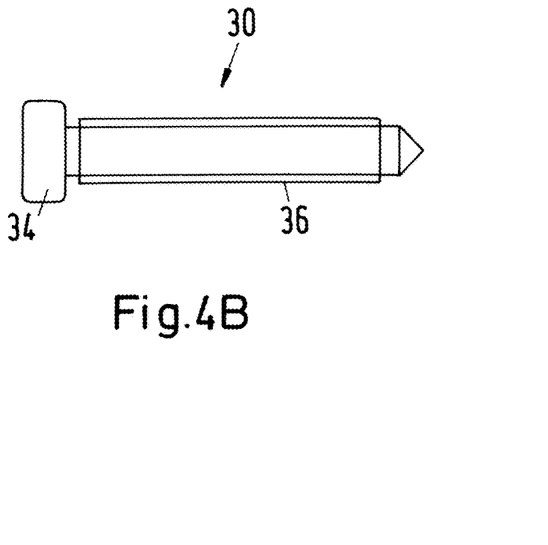

FIGS. 4A and 4B are used to explain an example below in which there is an assignment to object classes for only individual parts of a measurement object 24. FIG. 4A shows a measurement object 24 in the form of a threaded screw. Accordingly, the measurement object 24 comprises a head section 34 and a threaded section (or shaft) 36. FIG. 4B shows a reference object 30 defining an object class. The latter likewise comprises a head section 34 and also a threaded section 36.

It is clear from a comparison of FIGS. 4A and 4B that the head sections 34 deviate from one another and the threaded sections 36 have different sizes. More precisely, the head sections 34 have forms that deviate from one another and the threaded section 36 in FIG. 4B is longer than that of FIG. 4A. In this case, too, the measurement object 24 would initially be measured in order to ascertain its three-dimensional shape and store the latter in a data record. However, in this case, the evaluation device 26 of FIG. 1 is also configured to determine correspondences of only a part of the measurement object 24 with an object class or a reference object 30 that defines an object class.

Specifically, the evaluation device 26 is configured to determine that there is no correspondence between the forms of the head sections 34 of the measurement object 24 and of the reference object 30. Secondly, the evaluation device 26 can determine a correspondence in form in respect of the threaded sections 36, even if these have different dimensions.

In detail, each part of the reference object 30 in the form of the head section 34 and of the threaded section 36 represents a dedicated object class or else object subclass, assigned to which there is in each case a correspondingly object class-specific or object subclass-specific test plan. In principle, the evaluation device 26 is configured to assign a plurality of object classes with associated test plans to the measurement object 24. In the shown case, the evaluation device 26 would only select a test plan relating to the threaded section 36 for the purposes of creating the resultant test plan and scale the latter in a manner analogous to the example above, wherein the threaded section 36 represents a correspondingly dedicated object class. By contrast, for the head section 34, which likewise represents a dedicated object class, the evaluation device 26 would determine no correspondence and consequently would also not ascertain an associated test plan for creating the resultant test plan.

Figure 5A:
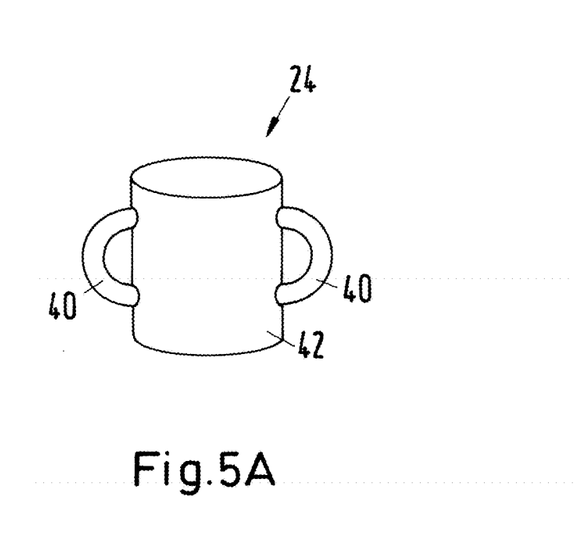
FIGS. 5A-5B show a further example of a measurement object and an object class-specific reference object, wherein object classes are only assigned for parts of the measurement object.
Figure 5B:
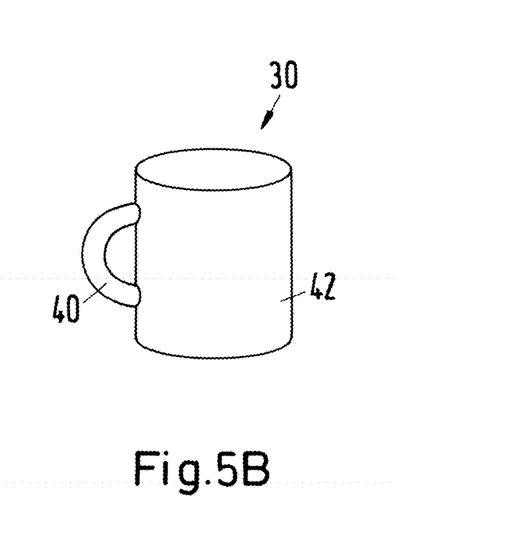

FIGS. 5A and 5B show a further example, in which different parts of a measurement object 24 can be assigned different object classes. It is possible to recognize that the measurement object 24 as per FIG. 5A is embodied as a cup with two handles 40. More precisely, the cup consists of a cylindrical body 42, on the outer side of which and at opposite positions two handles 40 are arranged. By contrast, the reference object 30 is defined as a cup with only one handle 40. However, in this case, the handle 40 and the body 42 of the reference object 30 can each define dedicated object classes, or can else be defined as object subclasses of an object class relating to cups.

Independently of the specifically chosen variant, the evaluation device 26 is configured, for example by means of pattern recognition methods, to ascertain that the measurement object 24 comprises parts or regions which should be assigned to the corresponding object classes of the reference part 30. More precisely, the evaluation device 26 ascertains that the measurement object 24 has two handles 40 and one body 42 by virtue of both the patterns describing the handles 40 and the pattern describing the body 42 being identified. These respective patterns can also be referred to as object class-specific patterns. The corresponding object class-specific test plans, which are saved for the reference object 30 or its handles 40 and the body 42, can be applied to the corresponding parts or regions of the measurement object 24 (i.e., the resultant test plan comprises a first test plan (or partial test plan) for the handles 40 and a second test plan (or partial test plan) for the body 42).

As an alternative to an assignment of the measurement object 24 or of at least parts thereof to object classes, a manual assignment by a user can also be provided in all of the aforementioned variants. In this case, the evaluation device 26 can optionally present propositions for suitable object classes, which can be ascertained in a manner analogous to above from a comparison between the measured properties of the measurement object 24 and the properties defining an object class (or properties of an associated reference object 30).

Figure 6:
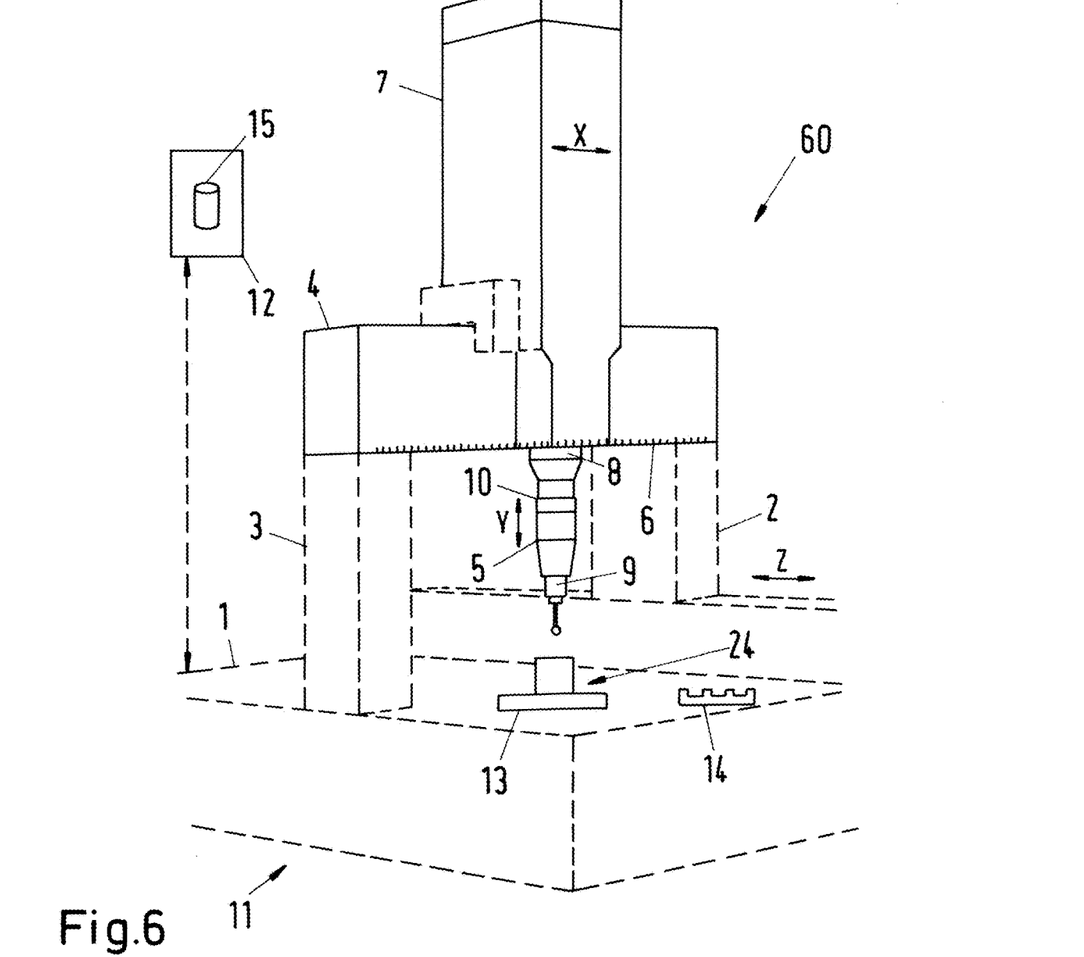
FIG. 6 shows a view of a second apparatus according to the invention, by means of which a second method according to the invention is able to be carried out.

FIG. 6 shows a second apparatus 11 according to the invention, which comprises a measuring machine in the form of a coordinate measuring machine (CMM) 60. In general, the CMM 60 serves to work through a resultant test plan for a measurement object 24 or to measure the object 24 according to the stipulation of this test plan. In a manner known in principle per se, the CMM 60 has a portal-type embodiment and comprises a measuring table 1 and columns 2, 3, which together with a crossbeam 4 form a portal of the CMM 60 and are displaceable over said measuring table. The crossbeam 4 is connected at its opposite ends to the columns 2 and 3, respectively, which are mounted longitudinally displaceably on the measuring table 1.

The crossbeam 4 is combined with a cross slide 7, which is movable, by way of air bearings, along the crossbeam 4 (in the X direction). The current position of the cross slide 7 relative to the crossbeam 4 can be determined on the basis of a scale graduation 6. A quill 8, which is movable in the vertical direction, is mounted on the cross slide 7 and connected at its lower end to a measurement sensor 5 by way of a mounting device 10. Removably arranged on the measurement sensor 5 is a probe head 9, which senses in a tactile manner. Instead of the probe head 9, the measurement sensor 5 could similarly comprise a contactlessly sensing sensor, in particular a laser sensor.

Arranged on the measuring table 1 is an additional rotatable measuring table 13, on which there is arranged a measurement object 24, which should be measured according to the stipulation of a test plan and which can be turned about a vertical axis of rotation by rotation of the measuring table 13. Also arranged on the measuring table 1 is a magazine 14, in which various probe heads that can be exchanged for the probe head 9 may be arranged, or in which various styluses that can be exchanged for the stylus carried on the probe head 9 may be arranged.

FIG. 6 also schematically shows a control device 12 of the CMM 60, which may for example be realized by a computer that has software and at least one data memory 15 and is connected by way of signal and control lines to drivable components of the coordinate measuring machine 60, in particular to drives. Furthermore, the control device 12 is connected by way of a measurement data connection to those elements of the CMM 60 that are used for determining measurement values obtained on the basis of the test plan. Since such elements and devices are generally known in the field of coordinate measuring machines 60, they are not discussed in detail here.

The control device 12 receives a resultant test plan for a measurement object 24 to be measured in accordance with this test plan. By way of example, the evaluation device 26 from FIG. 1 can transmit the resultant test plan, generated in accordance with the method described above, to the control device 12 of FIG. 6 via a data connection not illustrated separately. The control device 12 is configured to drive and/or operate the CMM 60 according to the stipulation of this test plan. In particular, the control device 12 is configured to identify the measurement points 32' (cf. FIG. 4A), which are defined in the resultant test plan or are derivable therefrom, and to drive the CMM 60 for capturing or measuring these measurement points 32'. The resultant measurement results can be stored in the data memory 15 and can form the basis of a further evaluation.

Figure 7:
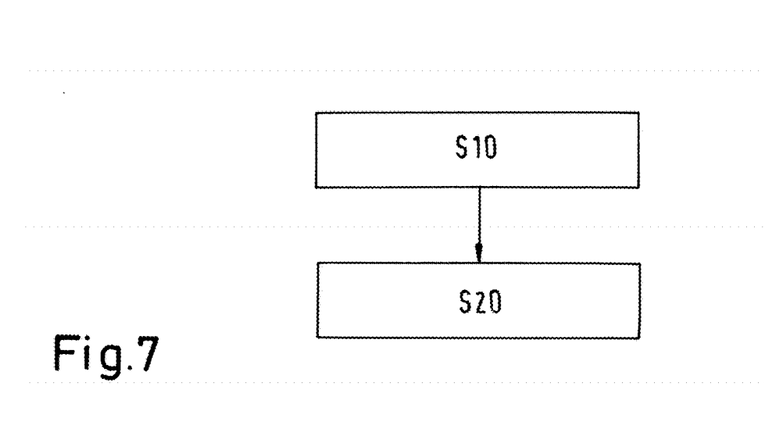
FIG. 7 shows a flowchart of the second method according to the invention.

FIG. 7 shows a flowchart for the method carried out by the apparatus 11. A resultant test plan is generated in step S10 (for example by means of the method explained on the basis of FIG. 2 and/or by means of the evaluation device 26 of FIG. 1). Then, this resultant test plan is carried out or worked through by the CMM 60 of FIG. 6 in step S20.

The phrase "at least one of A, B, and C" should be construed to mean a logical (A OR B OR C), using a non-exclusive logical OR, and should not be construed to mean "at least one of A, at least one of B, and at least one of C."

The invention claimed is:

1. A method for generating a resultant test plan for testing a measurement object, the method comprising:
 generating at least one data record by measuring the measurement object;
 assigning at least part of the measurement object to at least one object class based on the at least one data record;
 determining a test plan assigned to the at least one object class as an object-class-specific test plan; and
 determining the resultant test plan based on the object-class-specific test plan,
 wherein:
  the resultant test plan includes data instructing a coordinate measuring machine how to measure the measurement object, and
  the assigning the at least part of the measurement object to the at least one object class is performed independent of dimensions.

2. The method of claim 1 wherein:
 the assigning, the determining the test plan, and the determining the resultant test plan are performed by a first apparatus;
 the method further comprises transmitting the resultant test plan from the first apparatus to a second apparatus remote from the first apparatus; and
 the resultant test plan instructs the second apparatus regarding how to measure the measurement object.

3. The method of claim 1 wherein the at least one data record is generated by a three-dimensional measurement of the measurement object.

4. The method of claim 1 further comprising:
 performing a pattern recognition method based on data, wherein the measurement object is assigned to an object class if at least one recognized pattern corresponds to an object-class-specific pattern or deviates therefrom by no more than a predetermined measure.

5. The method of claim 1 wherein:
 the resultant test plan is at least partly generated by adapting the object-class-specific test plan; and
 the adaptation of the object-class-specific test plan is carried out based on at least one of:
  a difference between the measurement object and the object class, or
  a difference between the measurement object and a reference object of the object class.

6. The method of claim 5 wherein:
a geometric transformation between the measurement object or part of the measurement object and a reference object assigned the object-class-specific test plan is determined; and
the adaptation of the object-class-specific test plan is carried out based on the transformation.

7. The method of claim 6 wherein:
measurement points are determined from the resultant test plan and verified for the measurement object; and
the resultant test plan is verified if the measurement points were verified.

8. The method of claim 7 wherein position information items of measurement points that were predetermined based on the transformation are used during the verification.

9. The method of claim 1 wherein the object-class-specific test plan is adapted based on a spatial pose of the measurement object.

10. The method of claim 1 wherein an assignment, known in advance, between object properties determinable based on data and the object classes and/or an assignment, known in advance, between object classes and test plans is/are adapted based on object properties of a measurement object currently measured and/or the resultant test plan assigned to the measurement object.

11. The method of claim 1 wherein measurement information items for measuring the measurement object are determined based on an object class.

12. The method of claim 1 wherein the method is carried out as a simulation.

13. The method of claim 1 further comprising testing the measurement object in accordance with the test plan.

14. A non-transitory computer-readable medium comprising processor-executable instructions including:
generating at least one data record by measuring a measurement object;
assigning at least part of the measurement object to at least one object class based on the at least one data record;
determining a test plan assigned to the at least one object class as an object-class-specific test plan; and
determining a resultant test plan based on the object-class-specific test plan,
wherein:
the resultant test plan includes data instructing a coordinate measuring machine how to measure the measurement object, and
the assigning the at least part of the measurement object to the at least one object class is performed independent of dimensions.

15. An apparatus for generating a resultant test plan for testing a measurement object, the apparatus comprising:
an evaluation device; and
a measurement device,
wherein:
the measurement device is a coordinate measuring machine,
the measurement device is configured to generate at least one data record by measuring the measurement object,
the evaluation device is configured to, based on the at least one data record, assign at least part of the measurement object to at least one object class,
the evaluation device is configured to determine an object-class-specific test plan based on a test plan assigned to the object class,
the resultant test plan is determined based on the object-class-specific test plan,
the resultant test plan includes data instructing the coordinate measuring machine how to measure the measurement object, and
the assignment of the at least part of the measurement object to the at least one object class is performed independent of dimensions.

16. The apparatus of claim 15 further comprising a control device configured to test the measurement object in accordance with the test plan.

17. The apparatus of claim 15 wherein the evaluation device is configured to perform the assignment according to user control.

18. The apparatus of claim 15 wherein:
the measurement device includes a control device; and
the evaluation device is configured to perform the assignment by using the control device.

19. The apparatus of claim 15 wherein the evaluation device is configured to determine the resultant test plan based on the object-class-specific test plan.

20. The apparatus of claim 15 wherein:
the measurement device includes a control device; and
the control device is configured to determine the resultant test plan based on the object-class-specific test plan.

* * * * *